United States Patent
Oh et al.

(10) Patent No.: US 8,204,097 B2
(45) Date of Patent: Jun. 19, 2012

(54) ULTRA-WIDEBAND PULSE GENERATOR AND METHOD THEREOF

(75) Inventors: Mi-Kyung Oh, Daejon (KR); Jae-Young Kim, Daejon (KR); Kwang-Roh Park, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 693 days.

(21) Appl. No.: 12/444,881

(22) PCT Filed: Jun. 26, 2007

(86) PCT No.: PCT/KR2007/003084
§ 371 (c)(1),
(2), (4) Date: Apr. 9, 2009

(87) PCT Pub. No.: WO2008/047994
PCT Pub. Date: Apr. 24, 2008

(65) Prior Publication Data
US 2010/0046581 A1 Feb. 25, 2010

(30) Foreign Application Priority Data
Oct. 16, 2006 (KR) .................. 10-2006-0100496

(51) Int. Cl.
*H04B 1/00* (2006.01)
*H04L 27/00* (2006.01)
(52) U.S. Cl. .................................... 375/138; 375/295
(58) Field of Classification Search .............. 375/130, 375/138, 295
See application file for complete search history.

(56) References Cited

U.S. PATENT DOCUMENTS

| 6,026,125 | A | 2/2000 | Larrick, Jr. et al. |
| 6,985,532 | B2 | 1/2006 | Batra et al. |
| 7,283,595 | B2 * | 10/2007 | Jun .............................. 375/295 |
| 7,664,161 | B2 * | 2/2010 | Norimatsu et al. ........... 375/130 |

(Continued)

FOREIGN PATENT DOCUMENTS
JP    2004-032752 A    1/2004
(Continued)

OTHER PUBLICATIONS

International Search Report: mailed Sep. 17, 2007; PCT/KR2007/003084.

(Continued)

*Primary Examiner* — David B. Lugo
(74) *Attorney, Agent, or Firm* — Ladas & Parry LLP (57) ABSTRACT

Provided is an ultra-wideband pulse generator using a digital scheme. The ultra-wideband pulse generator and a method for generating an ultra-wideband pulse therein can easily generate various ultra-wideband pulses having a random center frequency and bandwidth according to digital control schemes in a pulse-based ultra-wideband wireless communication system. The ultra-wideband pulse generator includes: a pulse waveform converting block for converting digital pulse waveform information on a desired ultra-wideband pulse into pulse waveform information having positive and negative signs; an unit pulse generating block for multiplying the converted pulse waveform information by a preset short-width pulse and amplifying the resulting pulses according to gain information of the desired ultra-wideband pulse; a pulse waveform arranging block for arranging the amplified pulses at predetermined delayed intervals; and a pulse waveform shaping block for summing the arranged pulses into a single pulse and integrating the single pulse to output the desired ultra-wideband pulse.

20 Claims, 9 Drawing Sheets

U.S. PATENT DOCUMENTS

2007/0098044 A1* 5/2007 Kim et al. .................. 375/130
2007/0210848 A1* 9/2007 Jimenez et al. ............ 327/291

FOREIGN PATENT DOCUMENTS

| KR | 1020050066989 A | 6/2005 |
| KR | 1020050073720 A | 7/2005 |
| KR | 10-0520150 B1 | 9/2005 |
| KR | 10-0553884 B1 | 2/2006 |
| KR | 1020060021960 A | 3/2006 |

OTHER PUBLICATIONS

Mi-Kyung Oh, et al., "Digitally-Controlled UWB Pulse Generator for IEEE 802.15.4a systems" International Conference on Consumer Electronics, 2007. ICCE 2007. Digest of Technical Papers Jan. 10-14, 2007, pp. 1-2.

* cited by examiner

ULTRA-WIDEBAND PULSE GENERATOR AND METHOD THEREOF

TECHNICAL FIELD

The present invention relates to an ultra-wideband pulse generator using a digital scheme and a method for generating an ultra-wideband pulse therein; and, more particularly, to an ultra-wideband pulse generator using a digital scheme and a method for generating an ultra-wideband pulse therein, which can easily generate various ultra-wideband pulses having a random center frequency and bandwidth according to digital control schemes in a pulse-based ultra-wideband wireless communication system.

BACKGROUND ART

A pulse-based ultra-wideband wireless communication technology is characterized by low power consumption and inherent location awareness. The pulse-based ultra-wideband wireless communication technology was adopted as a physical layer technology of IEEE 802.15.4a, the international standard for low-speed location-aware Wireless Personal Area Network (WPAN), and is considered as a promising technology.

Figure 1:
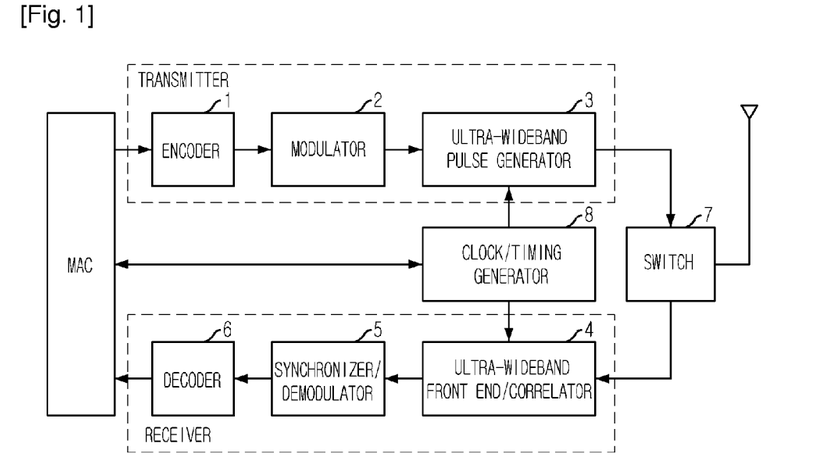
FIG. 1 is a block diagram of a conventional pulse-based ultra-wideband system.

FIG. 1 is a block diagram of a conventional pulse-based ultra-wideband system. Referring to FIG. 1, the pulse-based ultra-wideband system includes a transmitter and a receiver. The transmitter includes an encoder 1, a modulator 2, and an ultra-wideband pulse generator 3, and the receiver includes an ultra-wideband front end/correlator 4, a synchronizer/demodulator 5, and a decoder 6. In addition, the ultra-wideband system includes a switch or duplexer 7 and a clock/timing generator 8.

Figure 2:
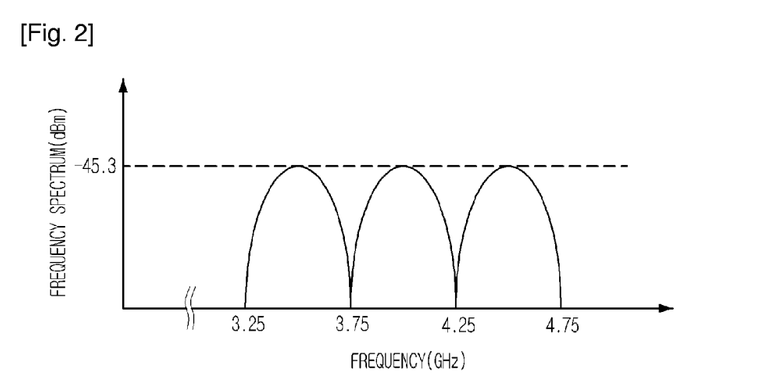
Figure 3:
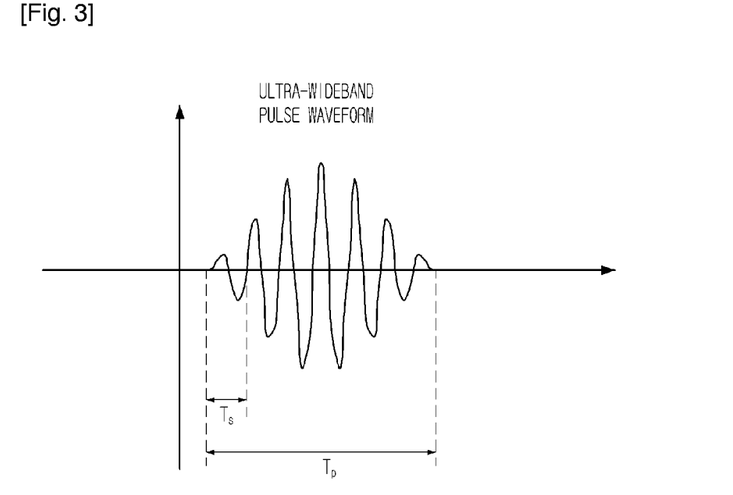
FIG. 3 illustrates a time-domain waveform of an ultra-wideband pulse satisfying the frequency band of FIG. 2.

FIG. 2 illustrates a frequency-domain waveform of an ultra-wideband pulse of 5 GHz or less, which is proposed in IEEE 802.15.4a, and FIG. 3 illustrates a time-domain waveform of an ultra-wideband pulse satisfying the frequency band of FIG. 2.

In order to satisfy the frequency band of FIG. 2, the time-domain waveform of the ultra-wideband pulse generated from the ultra-wideband pulse generator 3 of FIG. 1 has a connection of a plurality of sine waves with a random envelope as shown in FIG. 3. The ultra-wideband pulse generator 3 of the pulse-based ultra-wideband system generally generates a pulse shown in FIG. 4.

Figure 4:
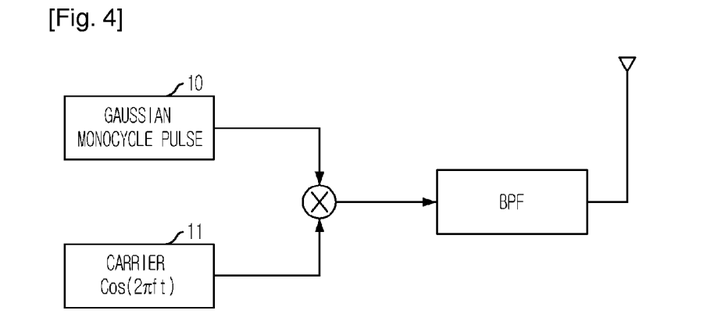
FIG. 4 is a block diagram of a conventional ultra-wideband pulse generator using a carrier.

FIG. 4 is a block diagram of a conventional ultra-wideband pulse generator using a carrier. Referring to FIG. 4, the conventional ultra-wideband pulse generator shifts the frequency band of the pulse using a Gaussian monocycle pulse 10 and a carrier 11 in order to meet the specification.

Although the conventional ultra-wideband pulse generator can generate the ultra-wideband pulse of FIG. 3, it is inefficient because of the use of a phase locked loop (PLL) that consumes a large amount of power in generating the carrier and occupies a large area. For these reasons, the conventional ultra-wideband pulse generator has difficulty in implementing a low-speed location-aware WPAN with a low cost and low power.

Although the conventional ultra-wideband pulse generator can generate the ultra-wideband pulse of FIG. 3 using an analog device, characteristics of the analog device may be changed or a chip clock and a carrier frequency are not generated by a common source. Therefore, the receiver has difficulty in synchronization reception.

DISCLOSURE OF INVENTION

Technical Problem

An embodiment of the present invention is directed to providing an ultra-wideband pulse generator using a digital scheme and a method for generating an ultra-wideband pulse therein, which can easily generate various ultra-wideband pulses having a random center frequency and bandwidth according to digital control schemes in a pulse-based ultra-wideband wireless communication system.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an ultra-wideband pulse generator using a digital scheme, which includes: a pulse waveform converting block for converting digital pulse waveform information on a desired ultra-wideband pulse into pulse waveform information having positive and negative signs; an unit pulse generating block for multiplying the converted pulse waveform information by a preset short-width pulse and amplifying the resulting pulses according to gain information of the desired ultra-wideband pulse; a pulse waveform arranging block for arranging the amplified pulses at predetermined delayed intervals; and a pulse waveform shaping block for summing the arranged pulses into a single pulse and integrating the single pulse to output the desired ultra-wideband pulse.

In accordance with another aspect of the present invention, there is provided n ultra-wideband pulse generator using a digital scheme, which includes: a pulse waveform converting block for converting digital pulse waveform information on a desired ultra-wideband pulse into pulse waveform information having positive and negative signs; an unit pulse generating block for multiplying the converted pulse waveform information by short-width pulses arranged at predetermined delayed intervals and amplifying the resulting pulses according to gain information of the desired ultra-wideband pulse; a pulse waveform arranging block for arranging the short-width pulses at the predetermined delayed intervals; and a pulse waveform shaping block for summing the arranged pulses into a single pulse and integrating the single pulse to output the desired ultra-wideband pulse.

In accordance with another aspect of the present invention, there is provided a method for generating an ultra-wideband pulse, comprising the steps of: converting digital pulse waveform information on a desired ultra-wideband pulse into pulse waveform information having positive and negative signs; multiplying the converted pulse waveform information by a preset short-width pulse and amplifying the resulting pulses according to gain information of the desired ultra-wideband pulse; arranging the amplified pulses at predetermined delayed intervals; and summing the arranged pulses into a single pulse and integrating the single pulse.

In accordance with another aspect of the present invention, there is provided a method for generating an ultra-wideband pulse, which includes the steps of: converting digital pulse waveform information on a desired ultra-wideband pulse into pulse waveform information having positive and negative signs; multiplying the converted pulse waveform information by short-width pulses arranged at predetermined delayed intervals and amplifying the resulting pulses according to gain information of the desired ultra-wideband pulse; and summing the arranged pulses into a single pulse and integrating the single pulse.

Advantageous Effects

An ultra-wideband pulse generator in accordance with embodiments of the present invention can easily generate various pulses with a random center frequency and bandwidth according to various applications.

In addition, multiple Simultaneous Operating Piconet (SOP) can be implemented by easily changing the frequency bands using the ultra-wideband pulse generator.

A low-power ultra-wideband pulse generator can be implemented by excluding circuits such as PLL with high power consumption and large occupation.

Due to the simplification and digital control, the present invention can be applied to pulse-based digital modulation schemes, such as Pulse Position Modulation (PPM), Burst Position Modulation (BPM), and Binary Phase Shift Keying (BPSK), and thus can be widely used in low-speed ultra-wideband wireless communication systems.

BRIEF DESCRIPTION OF THE DRAWINGS

FIG. 2 illustrates a frequency-domain waveform of an ultra-wideband pulse of 5 GHz or less, which is proposed in IEEE 802.15.4a.

MODE FOR THE INVENTION

The advantages, features and aspects of the invention will become apparent from the following description of the embodiments with reference to the accompanying drawings, which is set forth hereinafter.

Figure 5:
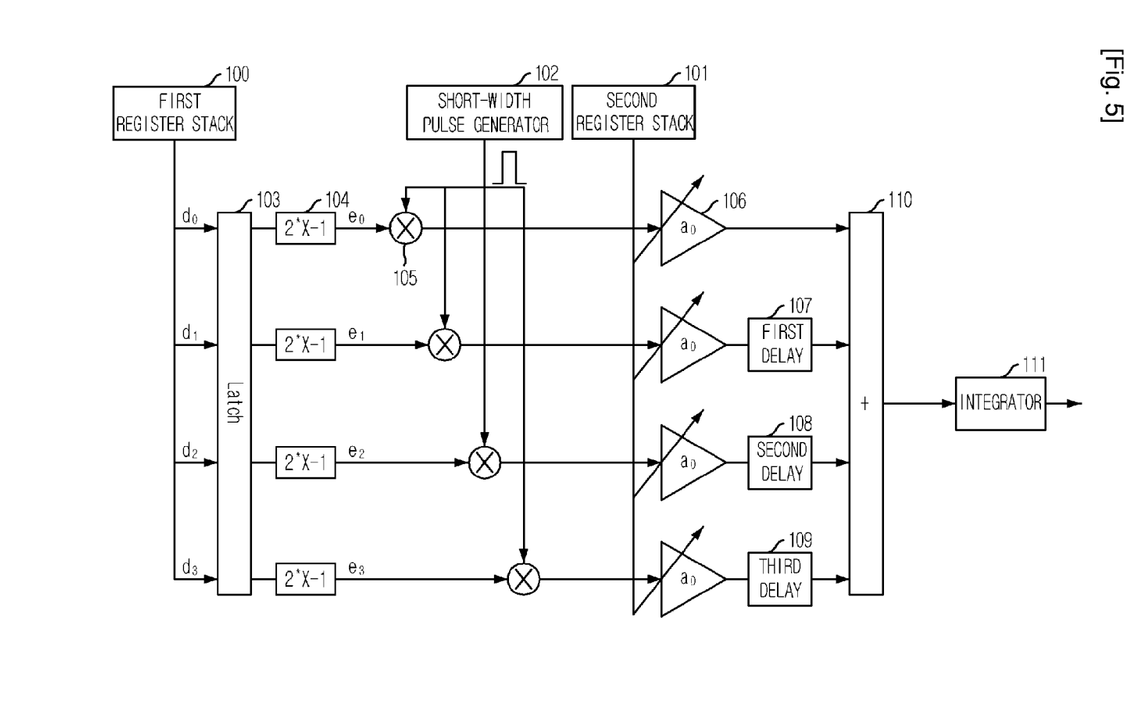
FIG. 5 is a block diagram of an ultra-wideband pulse generator using a digital scheme in accordance with an embodiment of the present invention.
Figure 6:
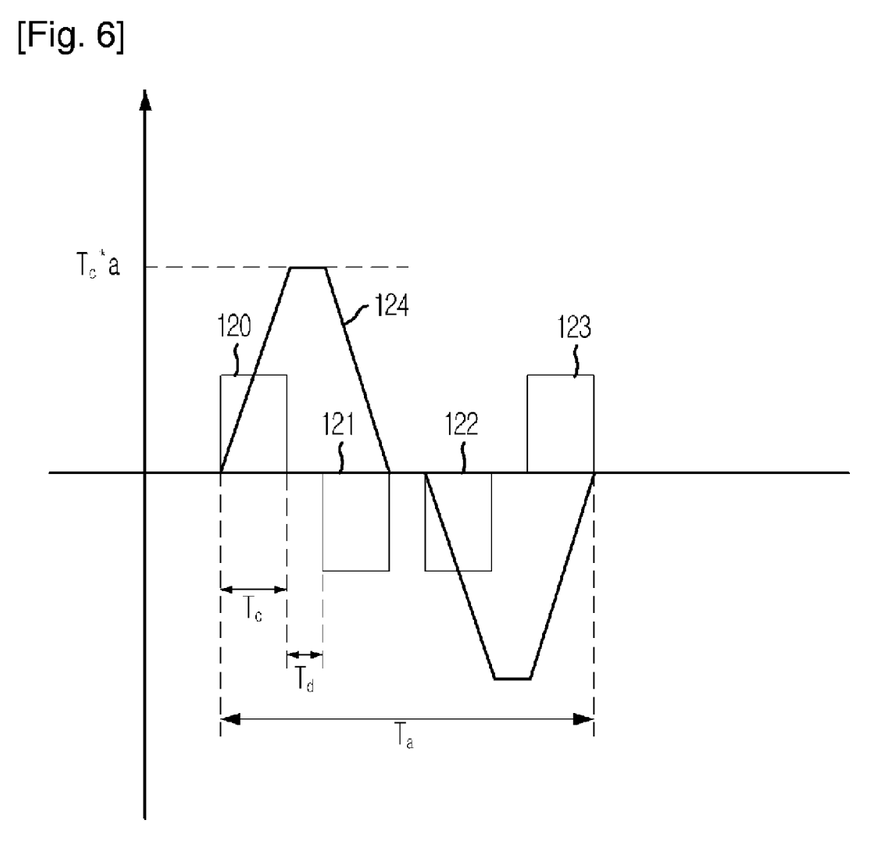
FIG. 6 is a waveform diagram of an ultra-wideband pulse outputted from the ultra-wideband pulse generator shown in FIG. 5.

FIG. 5 is a block diagram of an ultra-wideband pulse generator using a digital scheme in accordance with an embodiment of the present invention, and FIG. 6 is a waveform diagram of an ultra-wideband pulse outputted from the ultra-wideband pulse generator shown in FIG. 5.

Referring to FIG. 5, the ultra-wideband pulse generator includes a first register stack 100, a second register stack 101, a short-width pulse generator 102, a latch 103, a digital bit converter 104, a multiplexer 105, an amplifier 106, a first delay 107, a second delay 108, a third delay 109, a signal summer 110, and an integrator 111.

The ultra-wideband pulse generator of FIG. 5 generates a single approximated sine wave through four paths. At this point, in order to generate the sine wave of FIG. 6, the ultra-wideband pulse generator generates the approximated sine wave using only digital logics and analog devices without using an oscillator.

Meanwhile, the ultra-wideband pulse generator generates a plurality of approximated sine waves with different amplitudes and connects them in series to generate the ultra-wideband pulse. The ultra-wideband pulse generator will be described in more detail.

The first register stack 100 stores pulse waveform information on the basis of the frequency bandwidth and carrier frequency of the desired ultra-wideband pulse. At this point, the first register stack 100 outputs digital bit stream $[d_0,d_1,d_2,d_3]=[1,0,0,1]$ to the latch 103 as a stack value of the register having the pulse waveform information.

The second register stack 101 stores pulse gain information on the basis of an envelope of a desired ultra-wideband pulse. At this point, the second register stack 101 outputs $[a_0,a_1,a_2,a_3]=[a,a,a,a]$ to the amplifier 106 as stack values of the register having the pulse gain information.

The short-width pulse generator 102 generates a rectangular wave with a short width, i.e., unit amplitude. That is, the short-width pulse generator 102 generates a rectangular wave with a short width $T_c$ as expressed as Eq. 1 below.

MathFigure 1

$$r(t) = \begin{cases} 1 & 0 \le t < T_c \\ 0 & \text{elsewhere} \end{cases} \qquad \text{[Math. 1]}$$

The short-width pulse does not need to have the rectangular wave. The short-width pulse may have any waveform only if its first-order moment is not zero. The short-width waveform generated from the short-width pulse generator 102 is outputted to the multiplexer 105.

The latch 103 shifts the register stack values $d_0,d_1,d_2,d_3$ inputted from the first register stack 100 with a constant clock and outputs the shifted values to the digital bit converter 104.

The digital bit converter 104 converts the digital bit '0' into '−1' and the digital bit '1' into '1.' The digital bit represents the pulse waveform information inputted from the latch 103. That is, the digital bit converter 104 converts $[d_0,d_1,d_2,d_3]=[=1,0,0,1]$ into $[e_0,e_1,e_2,e_3]=[1,-1,-1,1]$ and outputs the converted digital bits to the multiplexer 105.

In addition, the digital bit converter 104 can convert the digital bits using a pulse-based digital modulation scheme, e.g., Pulse Position Modulation (PPM), Burst Position Modulation (BPM), and Binary Phase Shift Keying (BPSK).

The multiplexer 105 multiplies the converted values $e_0, e_1, e_2, e_3$ by the short-width waveform, the first-order moment of which is not zero. Herein, the multiplexer 105 multiplies the converted values by the rectangular wave of Eq. 1 and outputs the resulting waveform to the amplifier 106.

The amplifier 106 amplifies the converted waveform by the pulse gain information $[a_0, a_1, a_2, a_3] = [a, a, a, a]$ inputted from the second register stack 101. For the sake of convenience, it is assumed that the amplifier 106 outputs first to fourth waveforms. The amplifier 106 directly outputs the first rectangular wave 120 of FIG. 6 to the signal summer 110 without delay, and outputs the second to fourth rectangular waves to the respective delays 107, 108 and 109.

The delays 107, 108 and 109 delay the amplified waveforms by a predetermined value and outputs the delayed waveforms to the signal summer 110.

The delays 107, 108 and 109 can configure the respective digital patterns in the form of banks each having a different delay time.

As shown in FIG. 6, when the second rectangular wave is inputted from the amplifier 106, the delay 107 delays the second rectangular wave by $T_c + T_d$ to output the second waveform 121. When the third rectangular wave is inputted from the amplifier 106, the delay 108 delays the third rectangular wave by $2(T_c + T_d)$ to output the third waveform 122. When the fourth rectangular wave is inputted from the amplifier 106, the delay 109 delays the fourth rectangular wave by $3(T_c + T_d)$ to output the fourth waveform 123.

The signal summer 110 outputs a single signal by summing the plurality of waveforms, which are amplified by the amplifier 106 and delayed by the delays 107, 108 and 109. That is, the signal summer 110 sums the first to fourth waveforms 120 to 123 and outputs the single signal to the integrator 111.

The integrator 111 outputs an approximated sine wave by integrating the summed signal using a low pass filter (LPF). Specifically, the integrator 111 outputs the approximated sine wave 124 expressed in Eq. 2 below.

MathFigure 2

$$\tilde{u}_0(t) = T_c a \int e_0 r(t) + e_1 r(t-(T_c+T_d)) + e_2 r(t-2(T_c+T_d)) + e_3 r(t-3(T_c+T_d)) dt \quad \text{[Math.2]}$$

where $T_c \cdot a$ is the amplitude of the sine wave;

$T_c$ is the width of the rectangular wave of Eq. 1;

$T_d$ is the delay between rectangular pulses in FIG. 6; and e0, e1, e2, and e3 are bit-converted signals outputted from the digital bit converter 104.

As described above, Eq. 2 shows that the approximated sine wave is generated only using digital logics and analog devices, without using any oscillator. Since Eq. 2 represents the approximated sine wave as shown in FIG. 6, Eq. 2 can be rewritten as Eq. 3 below.

MathFigure 3

$$u_0(t) = \begin{cases} T_c \cdot a \cdot \sin(2\pi f_s t) & 0 \leq t < T_s \\ 0 & \text{elsewhere} \end{cases} \quad \text{[Math. 3]}$$

where $T_c \cdot a$ is the amplitude of the sine wave;

$T_c$ is the width of the rectangular wave of Eq. 1;

$f_s$ is $1/T_s$;

and $T_s$ is one period of the sine wave.

Figure 7:
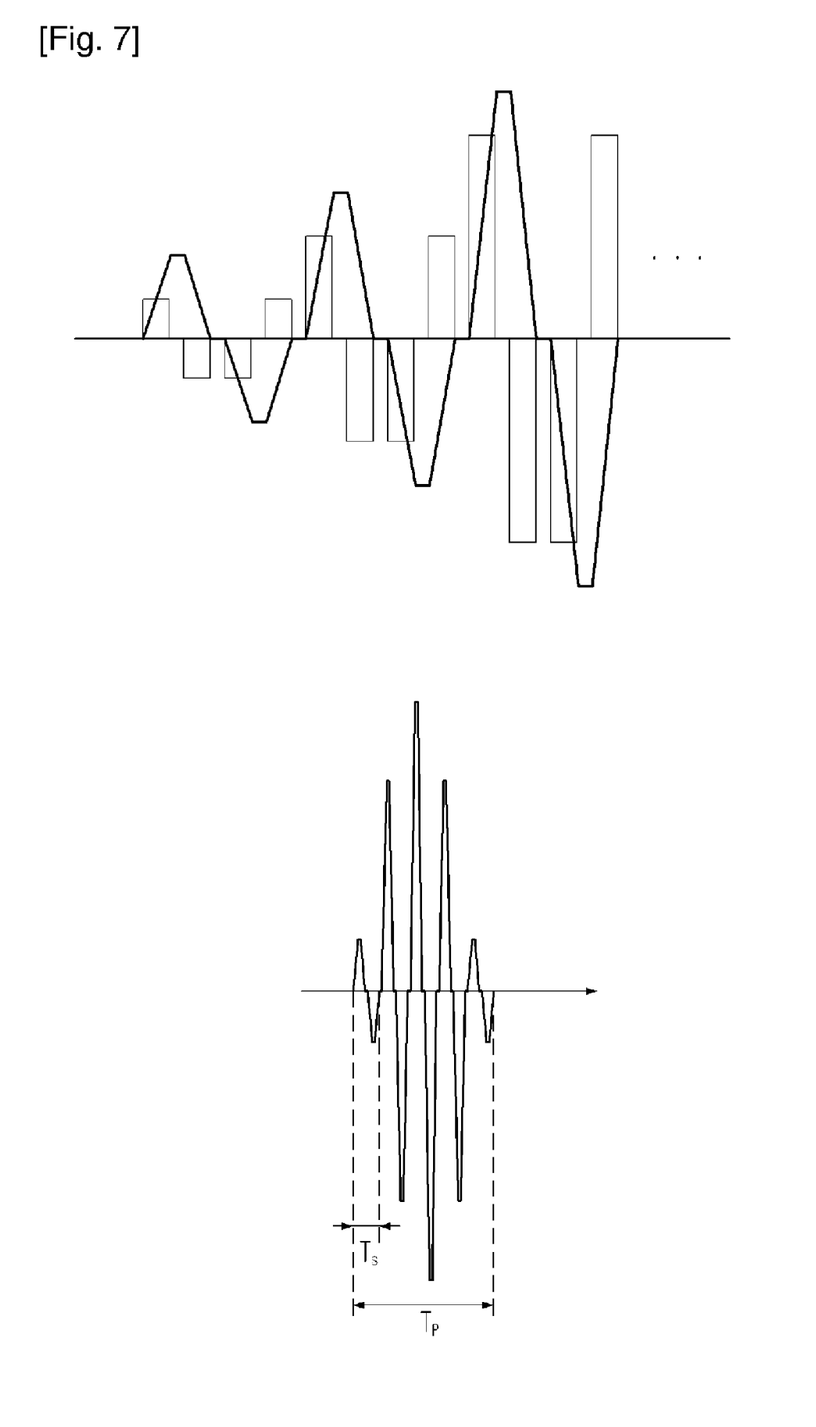
FIG. 7 illustrates an ultra-wideband pulse waveform outputted from the ultra-wideband pulse generator in accordance with an embodiment of the present invention.

FIG. 7 illustrates an ultra-wideband pulse waveform outputted from the ultra-wideband pulse generator in accordance with an embodiment of the present invention. As shown in FIG. 7, the ultra-wideband pulse generator generates five sine waves during the ultra-wideband pulse period $T_p$ to obtain the ultra-wideband pulse.

Specifically, the ultra-wideband pulse generator connects P sine waves (where P=5 in FIG. 5) during the ultra-wideband pulse period $T_p$ and determines the frequency of one sine wave as expressed in Eq. 4 below.

MathFigure 4

$$f_s = P/T_p \quad \text{[Math.4]}$$

In addition, the ultra-wideband pulse generator can generate the pulse of FIG. 7, where the P sine waves (P=5) are connected, during the ultra-wideband pulse period $T_p$ by summing P approximated sine waves of Eq. 3 like in Eq. 5 below.

MathFigure 5

$$s(t) = u_0(t) + u_1(t) + \ldots + u_{P-1}(t) \quad \text{[Math.5]}$$

In this way, the ultra-wideband pulse generator can generate the ultra-wideband pulse with a random center frequency and desired envelope using the P sine waves.

Figure 8:
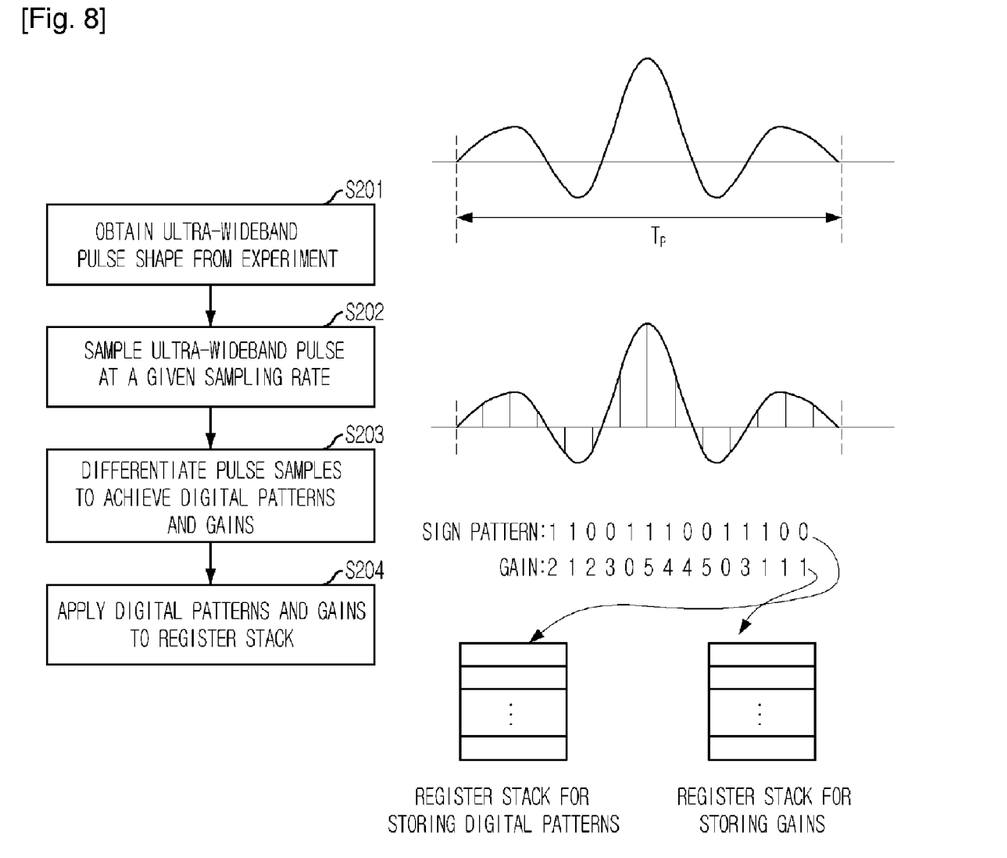
FIG. 8 is a flowchart illustrating a process of setting a register stack value for generating an ultra-wideband pulse in the ultra-wideband pulse generator in accordance with an embodiment of the present invention.

FIG. 8 is a flowchart illustrating a process of setting the register stack values for generating the ultra-wideband pulse in the ultra-wideband pulse generator in accordance with an embodiment of the present invention.

The ultra-wideband pulse generator in accordance with the present invention can generate the pulse with a random spread frequency spectrum without being based on the center frequency. At this point, the ultra-baseband pulse generator generates the sine wave of Eq. 5 not in each period, but based on a random shape of the desired ultra-wideband pulse.

A process of setting the register stack value will be described below. In step S201, a pulse period $T_p$ is calculated and a desired pulse shape is obtained through an experiment. The pulse period $T_p$ represents a total length of a desired pulse in a time domain.

In step S202, the generated ultra-wideband pulse is sampled according to delay time of the delays.

Then, the sampled pulse values are differentiated in a digital scheme. In step S203, the digital patterns representing the signs of the differentiated values and the gains of the differentiated values are sorted separately. The positive sign and the negative sign of the digital patterns are expressed by '1' and '0,' respectively. The gains of the differentiated values represent signal magnitude expressed by a predetermined number of bits.

The steps S202 and S203 can be performed in a reverse order. The step S203 is an analog differentiating step, and the step 202 is the sampling step based on the delay time provided in the ultra-wideband pulse generator.

In step 204, after selecting the patterns sorted in units of bits that can be received during one generation period of the ultra-wideband pulse generator, the digital patterns and the gain values are applied to the register stack.

The above-described steps are repeated when the intended ultra-wideband pulse is long.

The operation of the ultra-wideband pulse generator according to the generated register stack values will be described below with reference to FIGS. 9 to 12.

Figure 9:
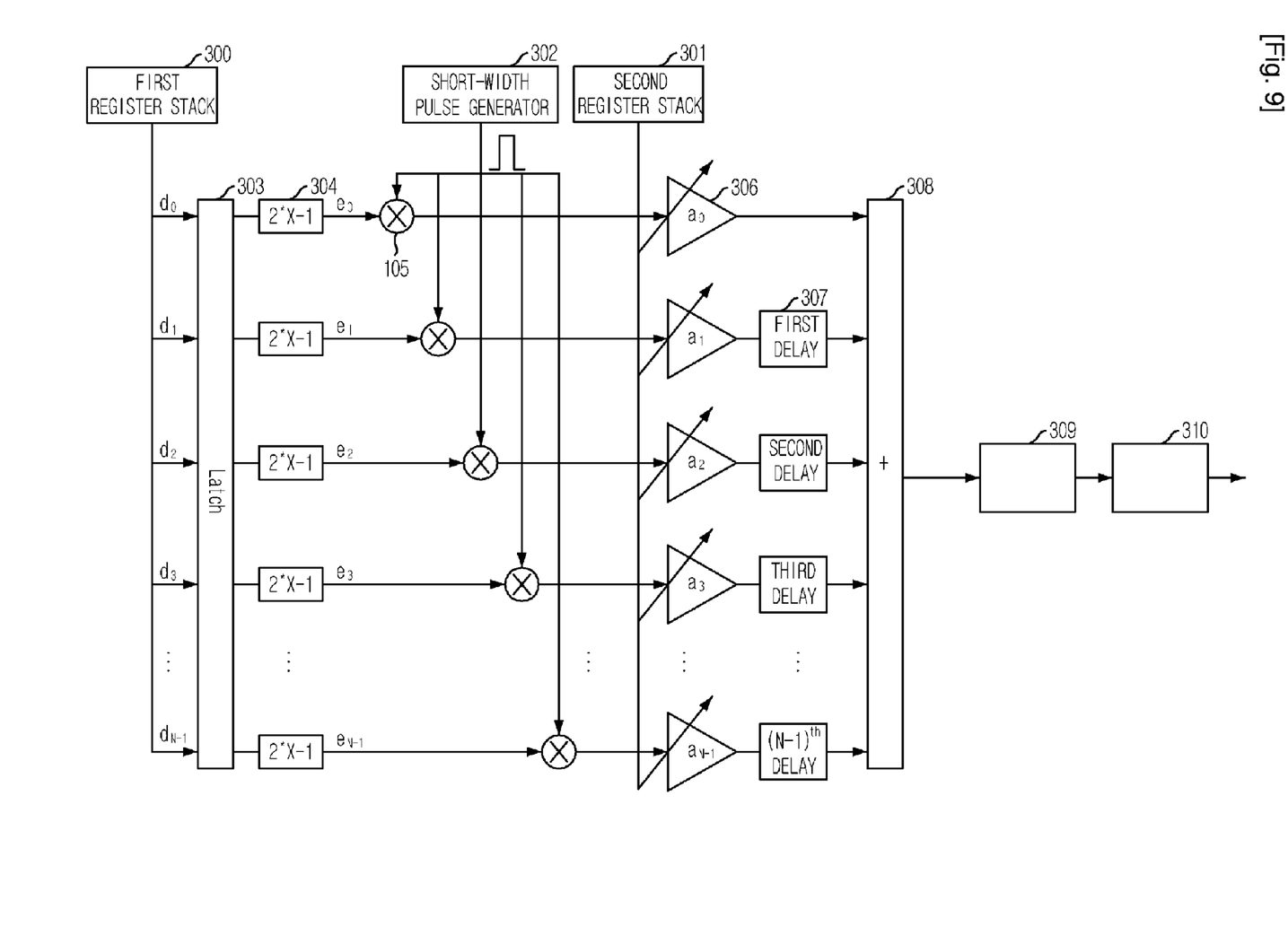
FIG. 9 is a block diagram of an ultra-wideband pulse generator using a digital scheme in accordance with an embodiment of the present invention.
Figure 10:
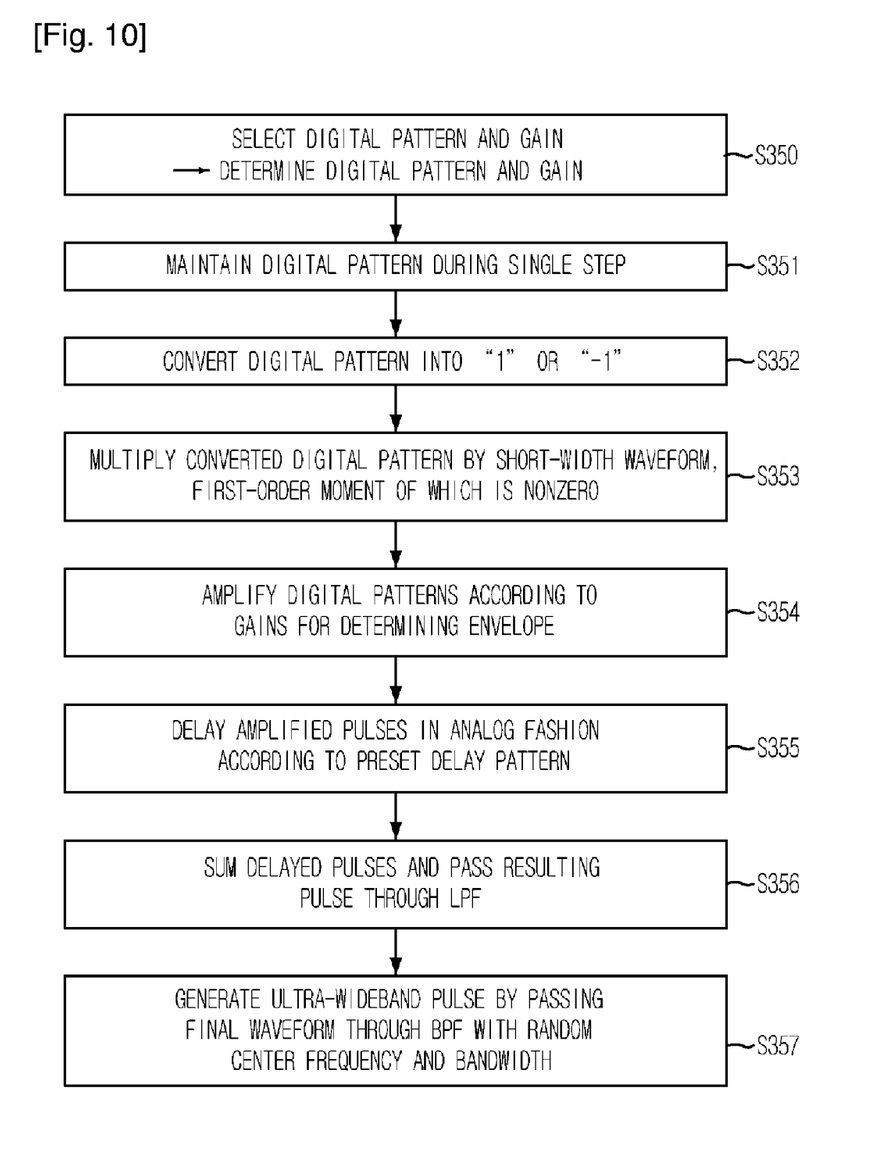
FIG. 10 is a flowchart illustrating a method for generating an ultra-wideband pulse using a digital scheme in accordance with an embodiment of the present invention.

FIG. 9 is a block diagram of an ultra-wideband pulse generator using a digital scheme in accordance with an embodiment of the present invention, and FIG. 10 is a flowchart illustrating a method for generating an ultra-wideband pulse using a digital scheme in accordance with an embodiment of the present invention. Since the components of the ultra-wideband pulse generator shown in FIG. 9 is identical to those shown in FIG. 5, their detailed description will refer to FIG. 5.

The ultra-wideband pulse generator in accordance with the present invention can generate the desired pulse in a single step, or multiple steps when the pulse is long.

In step S301, the ultra-wideband pulse generator starts the single step of generating the pulse by selecting one register value from the first register stack 300 storing the digital patterns representing the pulse waveform information and the second register stack 301 storing the gain values representing the pulse gain information. When the register stack value is selected, the ultra-wideband pulse generator determines the digital patterns $d_0, d_1, \ldots, d_{N-1}$ and the gain values $a_0, a_1, \ldots, a_{N-1}$ In step S351, the latch 303 of the ultra-wideband pulse generator maintains the digital patterns $d_0, d_1, \ldots, d_{N-1}$ during the single step of generating the pulse. The digital bit converter 304 converts the digital patterns inputted from the latch 303 into '1' or '−1.'

In step S353, the multiplier 305 multiplies the output value of the digital bit converter 304 by the short-width waveform, the first-order moment of which is not zero, and outputs the resulting value to the amplifier 306. In step S354, the amplifier 306 amplifies the output value of the multiplier 305 according to the gain value of the second register stack 301 for determining the envelope.

In step S355, the delay 307 delays the amplified pulses outputted from the amplifier 306 by a preset delay pattern in an analog scheme. In step S356, the summer 308 sums the delayed pulses and outputs the resulting pulse to the LPF 309.

In step S357, the ultra-wideband pulse generator generates an analog ultra-wideband pulse, which can be transmitted in practice, by passing the finally generated waveform through the BPF 310 with a random center frequency and bandwidth.

At this point, when the signal is outputted from the delay 307 having the longest delay time in the step S355, the above-described steps are repeated using other values of the register stacks until the signal has a desired pulse shape.

Figure 11:
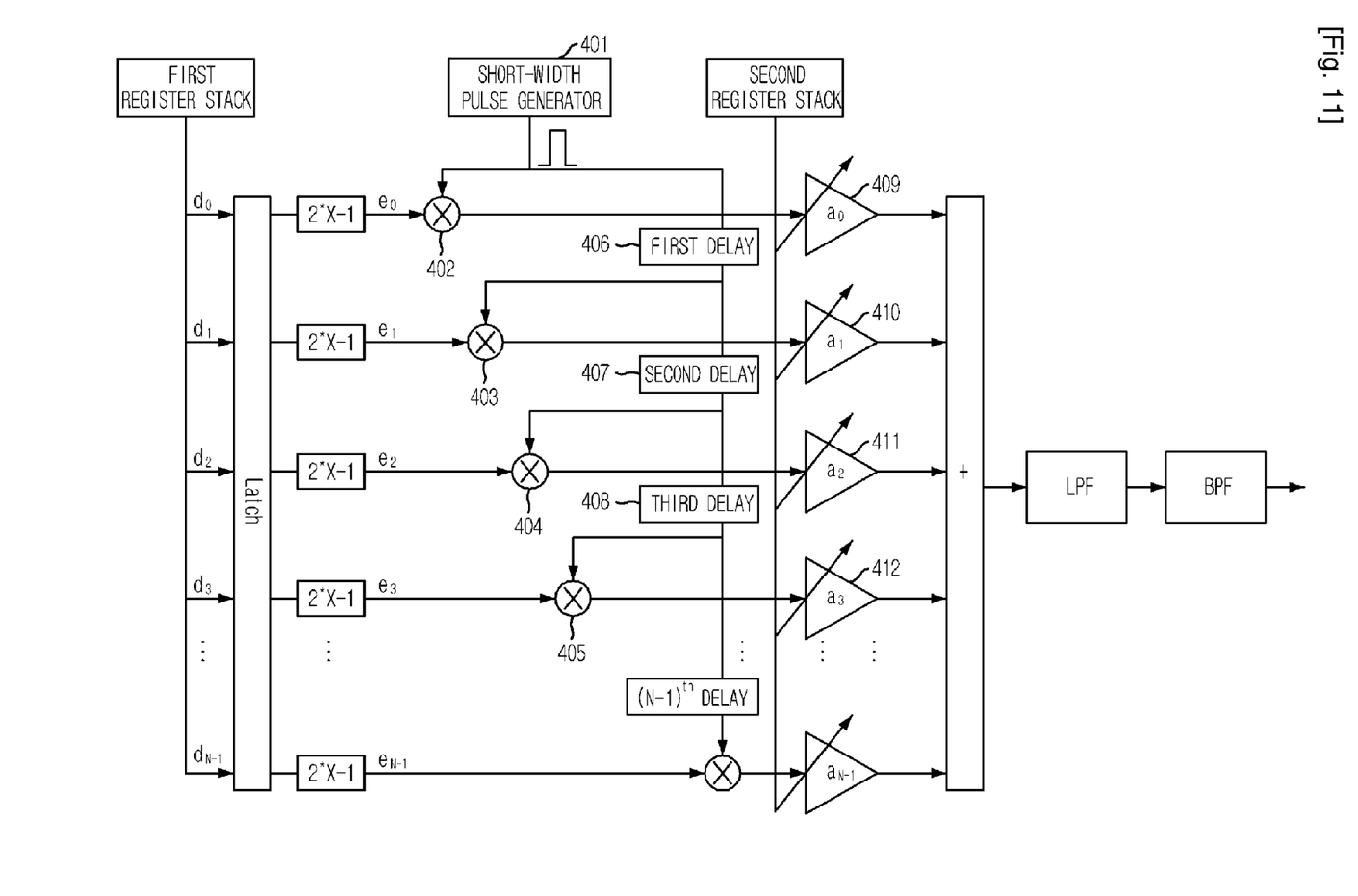
FIG. 11 is a block diagram of an ultra-wideband pulse generator using a digital scheme in accordance with another embodiment of the present invention.

FIG. 11 is a block diagram of an ultra-wideband pulse generator using a digital scheme in accordance with another embodiment of the present invention.

Since the components of the ultra-wideband pulse generator shown in FIG. 11 is identical to those shown in FIG. 9, their detailed description will be omitted.

Specifically, the ultra-wideband pulse generator of FIG. 11 is implemented by replacing the (N−1) delays having a different delay time with (N−1) delays having the same delay time.

Since the ultra-wideband pulse generator of FIG. 11 uses the delays having the same delay time, the size of the delay circuit and its occupied area can be minimized.

As described in FIG. 9, the ultra-wideband pulse generator of FIG. 11 outputs a single approximated sine wave with the same delay time by applying Eq. 2. The approximated sine wave is expressed as Eq. 6 below.

MathFigure 6

$$\tilde{u}_0(t) = T_c a \int e_0 r_0(t) + e_1 r_1(t) + e_2 r_2(t) + e_3 r_3(t) dt \quad [\text{Math.6}]$$

where $T_c \cdot a$ is the amplitude of the sine wave, and $r_0(t), r_1(t), r_2(t), r_3(t)$ are as defined in Eq. 7.

A rectangular wave delayed with the same delay time is expressed as Eq. 7 below.

MathFigure 7

$$r_0(t) := r(t)$$

$$r_1(t) := r_0(t - (T_c + T_d))$$

$$r_2(t) := r_1(t - (T_c + T_d))$$

$$r_3(t) := r_2(t - (T_c + T_d)) \quad [\text{Math.7}]$$

It can be seen from Eq. 7 that the first to third delays 406, 407 and 408 of FIG. 11 delay the waveform by the same delay time $T_c + T_d$.

That is, delays that are not shown in FIG. 11 are designed to have the same delay time. It is preferable that the minimum delay time of the delays of FIG. 9 is equally applied to the delays of FIG. 11.

The generation of the single approximated sine wave will be described below with reference to Eqs. 6 and 7. In the ultra-wideband pulse generator of FIG. 11, the first multiplier 402 multiplies the rectangular wave $r_0(t)$ from the short-width pulse generator 401 by $e_0$ without any delay and inputs the resulting signal to the amplifier 409. The second multiplier 403 multiplies the rectangular wave $r_1(t)$ by $e_1$ and inputs the resulting signal to the amplifier 410. The rectangular wave $r_1(t)$ is obtained by passing the rectangular wave $r_0(t)$ through the first delay 406 with the delay time $T_c + T_d$.

The third multiplier 404 multiplies the rectangular wave
$r_2(t)$
by
$e_2$
and inputs the resulting signal to the amplifier 411.
The rectangular wave
$r_2(t)$
is obtained by passing the rectangular wave
$r_1(t)$
through the second delay 407 with the delay time
$T_c+T_d$.
In addition, the fourth multiplier 405 multiplies the rectangular wave
$r_3(t)$
by
$e_3$
and inputs the resulting signal to the amplifier 412. The rectangular wave
$r_3(t)$
is obtained by passing the rectangular wave
$r_2(t)$
through the third delay 408 with the delay time
$T_c+T_d$.
Then, the ultra-wideband pulse generator generates the single approximated sine wave expressed as Eq. 6. Differently from the delays with the different delay time as shown in FIG. 9, the ultra-wideband pulse generator of FIG. 11 can generate the single approximated sine wave of Eq. 6 by using the delays with the same delay time as shown in FIG. 11. A plurality of the above-described approximated sine waves are generated and connected. In this way, the ultra-wideband pulse generator can generate the ultra-wideband pulse with a desired envelope, while having a random center frequency during the pulse period
$T_p$
on the basis of P sine waves.

Figure 12:
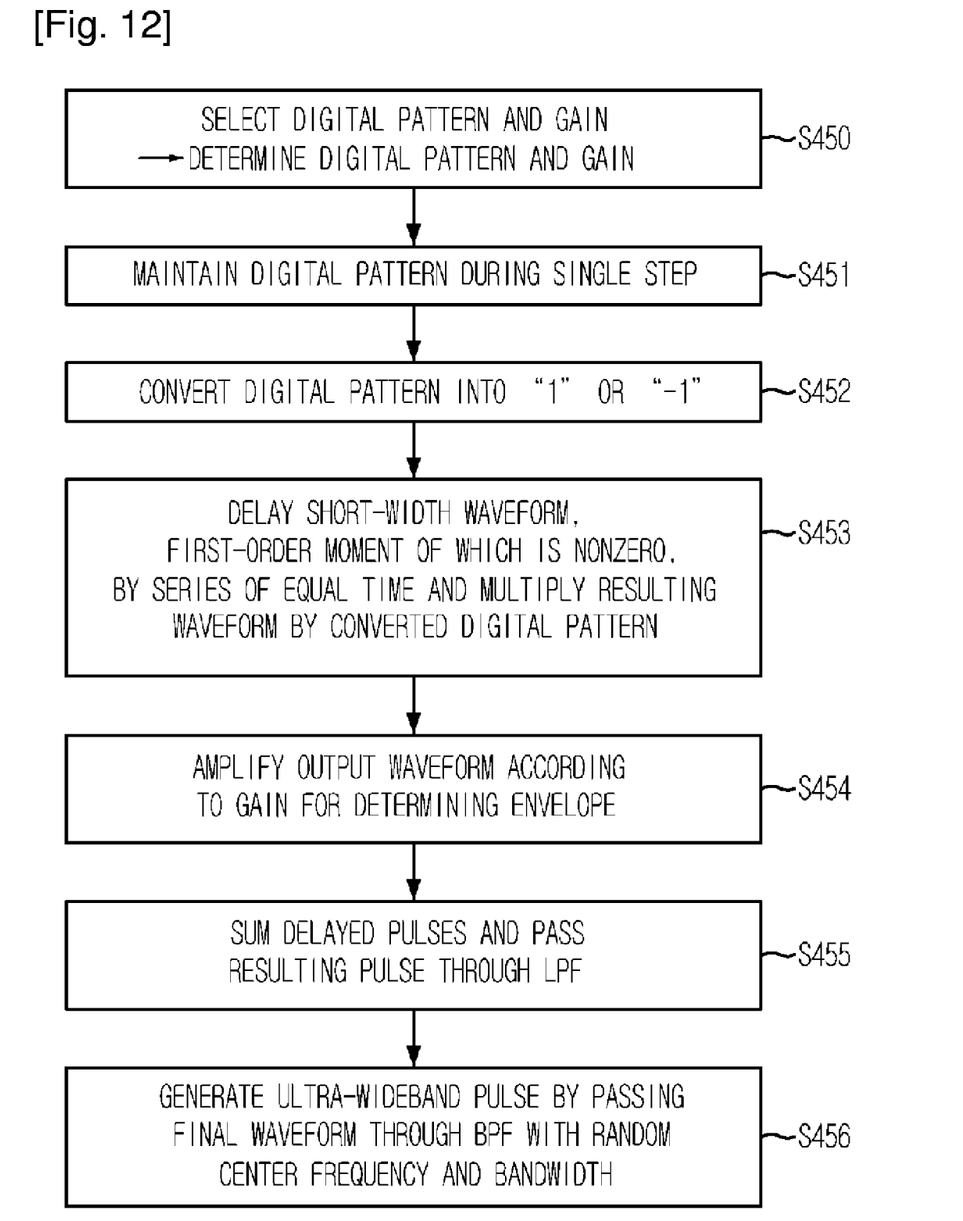
FIG. 12 is a flowchart illustrating a method for generating an ultra-wideband pulse using a digital scheme in accordance with an embodiment of the present invention.

FIG. 12 is a flowchart illustrating a method for generating an ultra-wideband pulse using a digital scheme in accordance with an embodiment of the present invention.

Since the ultra-wideband pulse generator of FIG. 11 is similar to those of FIG. 9, the ultra-wideband pulse generating method of FIG. 12 will be described with reference to FIG. 10. Specifically, the steps S450 to S452 of FIG. 12 refer to the steps S350 to S452 of FIG. 10, and the steps S454 to S456 of FIG. 12 refer to the steps S354 to S356 of FIG. 10.

After the step S452 of converting the digital patterns into '1' or '−1,' the ultra-wideband pulse generator multiplies the converted digital patterns by the signals obtained by delaying the short-width waveform, the first-order moment of which is not zero, by a series of the same time in step S453. That is, the ultra-wideband pulse generator multiplies the sequentially inputted digital patterns by the waveforms obtained by inputting the short-width waveforms and delaying them by the same time.

In step S454, the ultra-wideband pulse generator amplifies the outputted waveforms according to the gain values for determining the envelope.

Thereafter, the ultra-wideband pulse generator performs the steps S354, S356 and S357 of FIG. 10.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

The present application contains subject matter related to Korean Patent Application No. 2006-0100496, filed in the Korean Intellectual Property Office on Oct. 16, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. An ultra-wideband pulse generator using a digital scheme, comprising:
    a pulse waveform converting means for converting digital pulse waveform in-formation on a desired ultra-wideband pulse into pulse waveform information having positive and negative signs;
    a unit pulse generating means for multiplying the converted pulse waveform in-formation by a preset short-width pulse and amplifying the resulting pulses according to gain information of the desired ultra-wideband pulse;
    a pulse waveform arranging means for arranging the amplified pulses at pre-determined delayed intervals; and
    a pulse waveform shaping means for summing the arranged pulses into a single pulse and integrating the single pulse to output the desired ultra-wideband pulse.

2. The ultra-wideband pulse generator of claim 1, wherein the pulse waveform converting means converts the digital waveform information of '1' into '1' and the digital waveform information of '0' into '−1'.

3. The ultra-wideband pulse generator of claim 1, wherein the pulse waveform converting means converts the digital pulse waveform information into the pulse waveform information with the negative/positive signs by using a pulse-based digital modulation scheme.

4. The ultra-wideband pulse generator of claim 1, wherein the unit pulse generating means multiplies the converted pulse waveform information by short-width pulse, a first-order moment of which is not zero.

5. The ultra-wideband pulse generator of claim 1, wherein the pulse waveform arranging means is configured with banks each having a different delay time.

6. The ultra-wideband pulse generator of claim 1, wherein the pulse waveform shaping means integrates the single pulse through a low pass filter (LPF) and a band pass filter (BPF).

7. The ultra-wideband pulse generator of claim 1, wherein the pulse waveform converting means uses the digital pulse waveform information given by acquiring the desired ultra-wideband pulse from an experiment, differentiating sampled pulse values, and storing the differentiated values in a register stack, and the unit pulse generating means uses the gain information given by acquiring the desired ultra-wideband pulse from an experiment, differentiating sampled pulse values, and storing the differentiated values in a register stack.

8. An ultra-wideband pulse generator using a digital scheme, comprising:
    a pulse waveform converting means for converting digital pulse waveform in-formation on a desired ultra-wideband pulse into pulse waveform information having positive and negative signs;
    a unit pulse generating means for multiplying the converted pulse waveform in-formation by short-width pulses arranged at predetermined delayed intervals and amplifying the resulting pulses according to gain information of the desired ultra-wideband pulse;
    a pulse waveform arranging means for arranging the short-width pulses at the predetermined delayed intervals; and a pulse waveform shaping means for summing the arranged pulses into a single pulse and integrating the single pulse to output the desired ultra-wideband pulse.

9. The ultra-wideband pulse generator of claim 8, wherein the pulse waveform converting means converts the digital waveform information of '1' into '1' and the digital waveform information of '0' into '−1'.

10. The ultra-wideband pulse generator of claim 8, wherein the pulse waveform converting means converts the digital pulse waveform information into the pulse waveform information with the negative/positive signs by using a pulse-based digital modulation scheme.

11. The ultra-wideband pulse generator of claim 8, wherein the unit pulse generating means multiplies the converted pulse waveform information by short-width pulse, a first-order moment of which is not zero.

12. The ultra-wideband pulse generator of claim 8, wherein the pulse waveform arranging means is configured with banks each having a different delay time.

13. The ultra-wideband pulse generator of claim 8, wherein the pulse waveform shaping means integrates the single pulse through a low pass filter (LPF) and a band pass filter (BPF).

14. The ultra-wideband pulse generator of claim 8, wherein the pulse waveform converting means uses the digital pulse waveform information given by acquiring the desired ultra-wideband pulse from an experiment, differentiating sampled pulse values, and storing the differentiated values in a register stack, and the unit pulse generating means uses the gain information given by acquiring the desired ultra-wideband pulse from an experiment, differentiating sampled pulse values, and storing the differentiated values in a register stack.

15. A method for generating an ultra-wideband pulse, comprising the steps of:
converting digital pulse waveform information on a desired ultra-wideband pulse into pulse waveform information having positive and negative signs;
multiplying the converted pulse waveform information by a preset short-width pulse and amplifying the resulting pulses according to gain information of the desired ultra-wideband pulse;
arranging the amplified pulses at predetermined delayed intervals; and
summing the arranged pulses into a single pulse and integrating the single pulse.

16. The method of claim 15, further comprising, prior to the step of converting digital pulse waveform information on a desired ultra-wideband pulse into pulse waveform information having positive and negative signs, the steps of:
acquiring the desired ultra-wideband pulse through an experiment and sampling the acquired ultra-wideband pulse; and
differentiating the sampled pulse values and sorting the differentiated values to obtain the digital pulse waveform information and the gain information.

17. The method of claim 15, wherein the converted pulse waveform information is multiplied by short-width pulse, a first-order moment of which is not zero, in the step of multiplying the converted pulse waveform information by a preset short-width pulse and amplifying the resulting pulses according to gain information of the desired ultra-wideband pulse.

18. A method for generating an ultra-wideband pulse, comprising the steps of:
converting digital pulse waveform information on a desired ultra-wideband pulse into pulse waveform information having positive and negative signs;
multiplying the converted pulse waveform information by short-width pulses arranged at predetermined delayed intervals and amplifying the resulting pulses according to gain information of the desired ultra-wideband pulse; and
summing the arranged pulses into a single pulse and integrating the single pulse.

19. The method of claim 18, further comprising, prior to the step of converting digital pulse waveform information on a desired ultra-wideband pulse into pulse waveform information having positive and negative signs, the steps of:
acquiring the desired ultra-wideband pulse through an experiment and sampling the acquired ultra-wideband pulse; and
differentiating the sampled pulse values and sorting the differentiated values to obtain the digital pulse waveform information and the gain information.

20. The method of claim 18, wherein the converted pulse waveform information is multiplied by short-width pulse, a first-order moment of which is not zero, in the step of multiplying the converted pulse waveform information by short-width pulses arranged at predetermined delayed intervals and amplifying the resulting pulses according to gain information of the desired ultra-wideband pulse.

* * * * *